(No Model.)
F. T. WYCKOFF.
AUGER BIT.
No. 399,595. Patented Mar. 12, 1889.
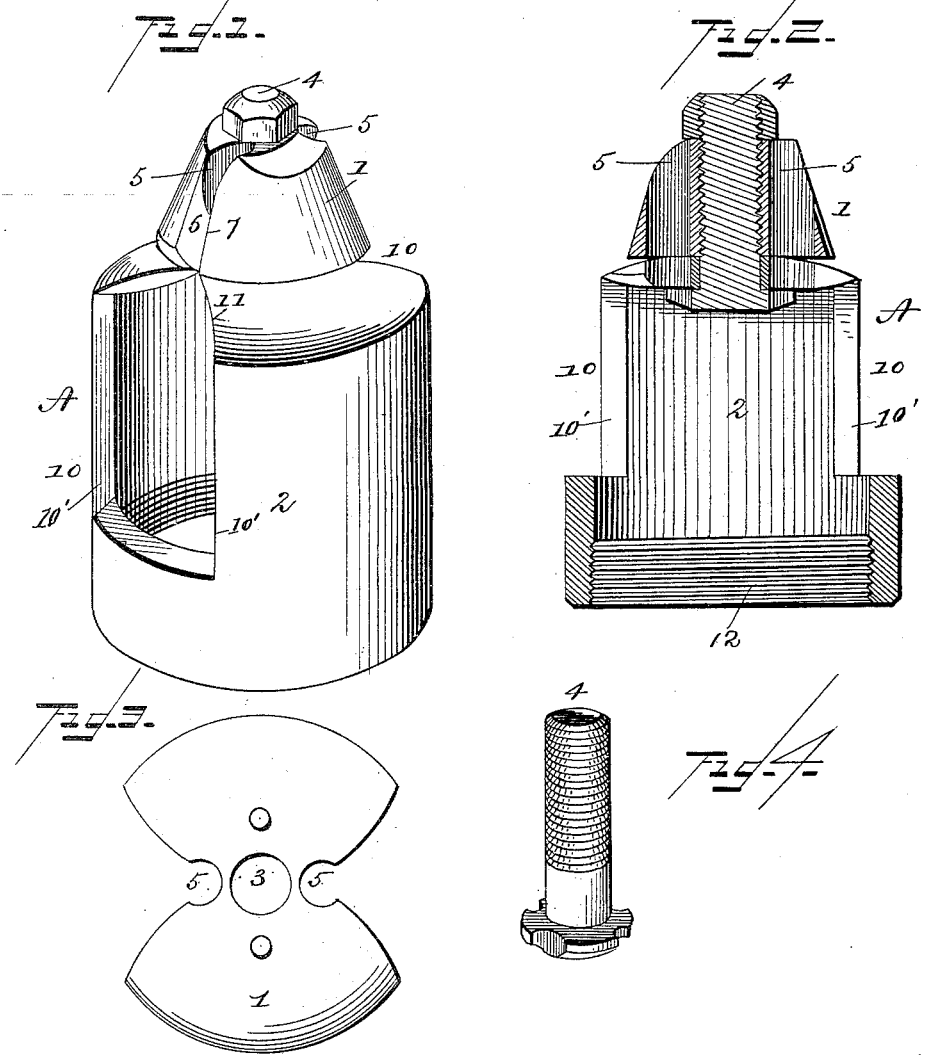
WITNESSES.
F. L. Ourand
R. W. Elliott
INVENTOR.
Frank T. Wyckoff
by Louis Bagger & Co.
Attorneys

UNITED STATES PATENT OFFICE.

FRANK T. WYCKOFF, OF WILLIAMSPORT, PENNSYLVANIA.

AUGER-BIT.

SPECIFICATION forming part of Letters Patent No. 399,595, dated March 12, 1889.

Application filed September 22, 1888. Serial No. 286,068. (No model.)

*To all whom it may concern:*

Be it known that I, FRANK T. WYCKOFF, a citizen of the United States, and a resident of Williamsport, in the county of Lycoming and State of Pennsylvania, have invented certain new and useful Improvements in Auger-Bits; and I do hereby declare that the following is a full, clear, and exact description of the invention, which will enable others skilled in the art to which it appertains to make and use the same, reference being had to the accompanying drawings, which form a part of this specification.

This invention relates to auger-bits, and more particularly to that class of auger-bits used for boring out pump-stocks and wooden water-pipes.

The object is to produce an auger-bit which shall be of such construction that it will follow a small opening previously made in a piece of wood, thereby enabling the operator to drill any desired hole and of any desired length with accuracy and ease.

With these objects in view the invention consists in the improved construction and combination of parts of an auger-bit, as will be hereinafter fully described in the specification, illustrated in the drawings, and pointed out in the claims.

In the accompanying drawings, forming part of this specification, and in which like letters of reference indicate corresponding parts, I have illustrated three different forms of auger-bits, illustrating three different methods of carrying my invention into effect, although there are many other ways of obtaining the same result without departing from the principle involved therein, and in these drawings—

Figure 1 is a perspective view of my improved auger-bit. Fig. 2 is a vertical sectional view of the same. Fig. 3 is a top plan view of the cutter with the leader removed. Fig. 4 is a perspective view of the bolt for holding the leader in place upon the cutter.

Referring to the drawings, A designates the auger-bit, consisting of two portions, 1 and 2, the upper portion, 1, being the leader and the lower portion, 2, the cutter, to which the leader is secured. The leader, as will be observed, is made cone-shaped and is provided with three openings, the center opening, 3, being designed for the reception of the bolt 4, for holding the same in place upon the cutter, and the two side openings, 5, being designed to form cutting-edges for the leader, which is done by grinding or cutting away part of the metal of the leader, as shown at 6, so as to produce this result, the cutting-edge being shown at 7 on each side of the cutter and opposite to the openings 8, which are engaged by bolts 9, for additionally bracing and securing the leader upon the cutter.

The cutter 2 is constructed of the same metal as the leader—that is, of steel—and each side is cut out to form an opening, 10. At the point where the leader is connected to the cutter is formed a cutting-shoulder, 11, which aligns with the cutting-edge 7 of the leader. The edges 10' are also ground to form cutting-edges, thus forming a cutting-edge which extends from the leader to the bottom of the opening 10, thus forming a continuous cutting-edge from the top of the leader to a point near the bottom of the cutter. The inner surface of the lower portion of the cutter is provided with screw-threads 12, by means of which it may be secured to the auger-bar.

Having now described the different parts of my device, I will proceed to show its method of operation.

When it is desired to bore out a piece of wood, say, four inches square, with an opening two and one-half inches in diameter, it is necessary that the auger-bit should penetrate the wood exactly in the center, so that the portion remaining on each side of the opening will be of the same thickness. In order to accomplish this result a small auger is first used, so as to form an opening for the leader, and where the piece of wood is extra long the boring will have to be done from both ends, so as to meet in the center. The hole thus bored should be equal to the size of the top of the leader. The leader is then inserted in the opening and the auger is operated, and by reason of the tapered shape of the leader it will follow the smaller opening and will not be thrown out of line, but will drill perfectly straight. Where larger openings are to be made, the same method is adopted as in the case just described.

It will thus be seen that although this peculiar auger-bit is exceedingly simple of construction it will be found highly efficient and durable in use and may be constructed at but a slight expense.

Having thus fully described my invention, what I claim as new, and desire to secure by Letters Patent, is—

1. An auger consisting of a cutter having cutting-edges and a cutting-shoulder and an opening through the shoulder, a leader on the shoulder having cutting-edges in its sides aligning with the cutting-edges of the cutter and a threaded opening through its center, and a bolt extending through the opening in the cutter and engaging the threaded opening in the leader, substantially as described.

2. An auger having a cutter provided with openings in its sides, the metal surrounding the openings forming cutting-edges, a leader having cutting-edges aligning with and forming a continuation of the cutting-edge of the cutter, and a bolt for holding the leader and cutter together, substantially as described.

In testimony that I claim the foregoing as my own I have hereunto affixed my signature in presence of two witnesses.

FRANK T. WYCKOFF.

Witnesses:
   GEO. S. BANGER,
   C. A. BOWMAN.